United States Patent
Higgins-Luthman et al.

(10) Patent No.: US 9,509,957 B2
(45) Date of Patent: Nov. 29, 2016

(54) VEHICLE IMAGING SYSTEM

(71) Applicant: MAGNA ELECTRONICS, INC., Auburn Hills, MI (US)

(72) Inventors: Michael J. Higgins-Luthman, Livonia, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 751 days.

(21) Appl. No.: 13/866,376

(22) Filed: Apr. 19, 2013

(65) Prior Publication Data

US 2013/0229523 A1    Sep. 5, 2013

Related U.S. Application Data

(62) Division of application No. 12/508,840, filed on Jul. 24, 2009, now abandoned.

(60) Provisional application No. 61/083,222, filed on Jul. 24, 2008.

(51) Int. Cl.
   *G06K 9/00* (2006.01)
   *H04N 7/18* (2006.01)
   (Continued)

(52) U.S. Cl.
   CPC ............... *H04N 7/18* (2013.01); *B60Q 1/1423* (2013.01); *B60R 1/00* (2013.01); *B60R 1/062* (2013.01);
   (Continued)

(58) Field of Classification Search
   CPC ............... B60R 2300/8093; B60R 2300/105; G06K 9/00362

USPC .......................................................... 348/148
See application file for complete search history.

(56) References Cited

U.S. PATENT DOCUMENTS

| | | |
|---|---|---|
| 2,632,040 A | 3/1953 | Rabinow |
| 2,827,594 A | 3/1958 | Rabinow |

(Continued)

FOREIGN PATENT DOCUMENTS

| | | |
|---|---|---|
| DE | 3248511 | 7/1984 |
| DE | 4107965 | 9/1991 |

(Continued)

OTHER PUBLICATIONS

Reexamination Control No. 90/007519 dated Jun. 9, 2005 Reexamination of U.S. Pat. No. 6,222,447 issued to Schofield et al.

(Continued)

*Primary Examiner* — Tung Vo
*Assistant Examiner* — Rowina Cattungal
(74) *Attorney, Agent, or Firm* — Gardner, Linn, Burkhart & Flory, LLP

(57) ABSTRACT

A vision system for a vehicle includes an image sensor and image processor. The image sensor is disposed at the vehicle and has a field of view exterior of the vehicle for capturing image data of a scene forward of the vehicle. The field of view encompasses at least a portion of a road surface ahead of and in the direction of travel of the vehicle. The image processor processes captured image data. Responsive to image processing of captured image data by the image processor, the vehicle vision system determines the presence of an animal on the road surface within the field of view. At least in part responsive to determination of the animal on the road surface within the field of view, the vehicle vision system at least one of (a) generates an alert and (b) controls the vehicle.

20 Claims, 8 Drawing Sheets

(51) Int. Cl.
*B60Q 1/14* (2006.01)
*B60R 1/00* (2006.01)
*B60R 1/062* (2006.01)
*B60R 1/12* (2006.01)
*B60W 30/16* (2012.01)

(52) U.S. Cl.
CPC ............. *B60R 1/12* (2013.01); *G06K 9/00362* (2013.01); *B60Q 2300/054* (2013.01); *B60R 2001/1215* (2013.01); *B60R 2300/105* (2013.01); *B60R 2300/307* (2013.01); *B60R 2300/8093* (2013.01); *B60W 30/16* (2013.01); *B60W 2550/14* (2013.01); *B60W 2550/148* (2013.01)

(56) References Cited

U.S. PATENT DOCUMENTS

| | | |
|---|---|---|
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,057,911 A | 11/1977 | Sack |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,236,099 A | 11/1980 | Rosenblum |
| 4,247,870 A | 1/1981 | Gabel |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,647,161 A | 3/1987 | Muller |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,727,290 A | 2/1988 | Smith et al. |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi |
| 5,124,549 A | 6/1992 | Michaels et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,182,502 A | 1/1993 | Slotkowski et al. |
| 5,184,956 A | 2/1993 | Langlais et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |

(56) References Cited

U.S. PATENT DOCUMENTS

| | | |
|---|---|---|
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,318 A | 5/1995 | Hegyi |
| 5,424,952 A | 6/1995 | Asayama |
| 5,426,294 A | 6/1995 | Kobayashi et al. |
| 5,430,431 A | 7/1995 | Nelson |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,510,983 A | 4/1996 | Iino |
| 5,515,448 A | 5/1996 | Nishitani |
| 5,528,698 A | 6/1996 | Kamei et al. |
| 5,529,138 A | 6/1996 | Shaw et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,568,027 A | 10/1996 | Teder |
| 5,574,443 A | 11/1996 | Hsieh |
| 5,614,788 A | 3/1997 | Mullins et al. |
| 5,634,709 A | 6/1997 | Iwama |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,765,116 A | 6/1998 | Wilson-Jones et al. |
| 5,781,437 A | 7/1998 | Wiemer et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,837,994 A | 11/1998 | Stam et al. |
| 5,841,538 A | 11/1998 | Schoeffler et al. |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,897 A | 3/1999 | Schofield et al. |
| 5,883,739 A | 3/1999 | Ashihara et al. |
| 5,890,021 A | 3/1999 | Onoda |
| 5,892,434 A | 4/1999 | Carlson et al. |
| 5,896,085 A | 4/1999 | Mori et al. |
| 5,923,027 A | 7/1999 | Stam et al. |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,124,886 A | 9/2000 | DeLine et al. |
| 6,144,022 A | 11/2000 | Tenenbaum |
| 6,172,613 B1 | 1/2001 | DeLine et al. |
| 6,201,642 B1 | 3/2001 | Bos |
| 6,222,447 B1 | 4/2001 | Schofield et al. |
| 6,243,003 B1 | 6/2001 | DeLine et al. |
| 6,302,545 B1 | 10/2001 | Schofield et al. |
| 6,313,454 B1 | 11/2001 | Bos et al. |
| 6,320,176 B1 | 11/2001 | Schofield et al. |
| 6,396,397 B1 | 5/2002 | Schofield et al. |
| 6,411,328 B1 | 6/2002 | Franke et al. |
| 6,424,273 B1 | 7/2002 | Gutta et al. |
| 6,433,676 B2 | 8/2002 | DeLine et al. |
| 6,442,465 B2 | 8/2002 | Breed et al. |
| 6,497,503 B1 | 12/2002 | Dassanayak |
| 6,498,620 B2 | 12/2002 | Schofield et al. |
| 6,523,964 B2 | 2/2003 | Schofield et al. |
| 6,534,884 B2 | 3/2003 | Marcus et al. |
| 6,553,130 B1 | 4/2003 | Lemelson et al. |
| 6,559,435 B2 | 5/2003 | Schofield et al. |
| 6,611,202 B2 | 8/2003 | Schofield et al. |
| 6,636,258 B2 | 10/2003 | Strumolo |
| 6,650,233 B2 | 11/2003 | DeLine et al. |
| 6,672,731 B2 | 1/2004 | Schnell et al. |
| 6,717,610 B1 | 4/2004 | Bos et al. |
| 6,793,177 B2 | 9/2004 | Bonutti |
| 6,802,617 B2 | 10/2004 | Schofield et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,953,253 B2 | 10/2005 | Schofield et al. |
| 6,975,775 B2 | 12/2005 | Rykowski et al. |
| 7,062,300 B1 | 6/2006 | Kim |
| 7,227,459 B2 | 6/2007 | Bos et al. |
| 7,269,504 B2 | 9/2007 | Gardner et al. |
| 7,302,344 B2 | 11/2007 | Olney et al. |
| 7,428,449 B2 | 9/2008 | Fehr et al. |
| 7,463,138 B2 | 12/2008 | Pawlicki et al. |
| 7,554,435 B2 | 6/2009 | Tengler et al. |
| 8,014,928 B2 | 9/2011 | Mills et al. |
| 2002/0015153 A1 | 2/2002 | Downs |
| 2002/0126875 A1 | 9/2002 | Naoi et al. |
| 2004/0051634 A1 | 3/2004 | Schofield et al. |
| 2004/0114381 A1 | 6/2004 | Salmeen et al. |
| 2004/0200948 A1 | 10/2004 | Bos et al. |
| 2005/0146792 A1 | 7/2005 | Schofield et al. |
| 2005/0200700 A1 | 9/2005 | Schofield et al. |
| 2005/0219852 A1 | 10/2005 | Stam et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0091813 A1 | 5/2006 | Stam et al. |
| 2006/0184297 A1 | 8/2006 | Higgins-Luthman |
| 2006/0213714 A1* | 9/2006 | Igawa ................ B60R 21/0134 180/274 |
| 2006/0235598 A1* | 10/2006 | Kudo .................... G08G 1/166 701/96 |
| 2006/0293841 A1 | 12/2006 | Hrovat et al. |
| 2007/0023613 A1 | 2/2007 | Schofield et al. |
| 2007/0109406 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0120706 A1 | 5/2007 | Schofield et al. |
| 2007/0154063 A1 | 7/2007 | Breed |
| 2007/0176080 A1 | 8/2007 | Schofield et al. |
| 2008/0024607 A1* | 1/2008 | Ozaki ..................... G01S 7/497 348/148 |
| 2008/0129541 A1 | 6/2008 | Lu et al. |
| 2008/0130954 A1* | 6/2008 | Taniguchi .......... G06K 9/00805 382/104 |
| 2008/0147277 A1 | 6/2008 | Lu et al. |
| 2009/0016073 A1 | 1/2009 | Higgins-Luthman et al. |
| 2009/0045323 A1 | 2/2009 | Lu et al. |

(56) References Cited

U.S. PATENT DOCUMENTS

| | | | |
|---|---|---|---|
| 2009/0097038 A1 | 4/2009 | Higgins-Luthman et al. | |
| 2009/0201192 A1* | 8/2009 | Tokoro | B60R 21/0134 342/70 |
| 2010/0020170 A1 | 1/2010 | Higgins-Luthman et al. | |

FOREIGN PATENT DOCUMENTS

| | | |
|---|---|---|
| DE | 4118208 | 11/1991 |
| DE | 4139515 | 6/1992 |
| DE | 4123641 | 1/1993 |
| EP | 048506 | 5/1985 |
| EP | 0048810 | 9/1985 |
| EP | 0202460 | 11/1986 |
| EP | 0416222 | 3/1991 |
| EP | 0426503 | 5/1991 |
| EP | 0450553 | 10/1991 |
| EP | 0492591 | 7/1992 |
| EP | 0513476 | 11/1992 |
| EP | 0788947 | 8/1997 |
| EP | 0669559 | 8/1999 |
| EP | 0830267 | 12/2001 |
| FR | 2513198 | 3/1983 |
| FR | 2585991 | 2/1987 |
| FR | 2641237 | 7/1990 |
| FR | 2672857 | 8/1992 |
| FR | 2673499 | 9/1992 |
| FR | 2726144 | 4/1996 |
| GB | 1535182 | 12/1978 |
| GB | 2029343 | 3/1980 |
| GB | 2119087 | 11/1983 |
| GB | 2137373 | 10/1984 |
| GB | 2156295 | 10/1985 |
| GB | 2244187 | 11/1991 |
| GB | 2255539 | 11/1992 |
| GB | 2267341 | 12/1993 |
| GB | 2327823 | 2/1999 |
| JP | 5819941 | 2/1982 |
| JP | 57173801 | 10/1982 |
| JP | 57208530 | 12/1982 |
| JP | 58110334 | 6/1983 |
| JP | 57208531 | 12/1983 |
| JP | 58209635 | 12/1983 |
| JP | 5951301 | 3/1984 |
| JP | 5951325 | 3/1984 |
| JP | 59114139 | 7/1984 |
| JP | 59133336 | 9/1984 |
| JP | 6080953 | 5/1985 |
| JP | 60166651 | 8/1985 |
| JP | 0212730 | 10/1985 |
| JP | 60261275 | 12/1985 |
| JP | 6154942 | 3/1986 |
| JP | 6156638 | 3/1986 |
| JP | 6243543 | 2/1987 |
| JP | 62122487 | 6/1987 |
| JP | 62122844 | 6/1987 |
| JP | 62131837 | 6/1987 |
| JP | 6414700 | 1/1989 |
| JP | 01123587 | 5/1989 |
| JP | 30061192 | 3/1991 |
| JP | 03099952 | 4/1991 |
| JP | 042394 | 11/1991 |
| JP | 3284413 | 12/1991 |
| JP | 417386 | 1/1992 |
| JP | 40245886 | 2/1992 |
| JP | 4114587 | 4/1992 |
| JP | 50000638 | 1/1993 |
| JP | 0577657 | 3/1993 |
| JP | 05050883 | 3/1993 |
| JP | 5213113 | 8/1993 |
| JP | 6107035 | 4/1994 |
| JP | 6227318 | 8/1994 |
| JP | 06267304 | 9/1994 |
| JP | 06276524 | 9/1994 |
| JP | 06295601 | 10/1994 |
| JP | 0732936 | 2/1995 |
| JP | 0747878 | 2/1995 |
| JP | 07052706 | 2/1995 |
| JP | 074170 | 3/1995 |
| JP | 0769125 | 3/1995 |
| JP | 07105496 | 4/1995 |
| JP | 08166221 | 6/1996 |
| JP | 02630604 | 4/1997 |
| WO | WO 86/05147 | 9/1986 |
| WO | WO 94/19212 | 9/1994 |
| WO | WO 94/27262 | 11/1994 |
| WO | WO 96/21581 | 7/1996 |
| WO | WO 96/38319 | 12/1996 |
| WO | WO 97/35743 | 10/1997 |
| WO | WO 98/14974 | 4/1998 |
| WO | WO 98/58450 | 12/1998 |
| WO | WO 99/14088 | 3/1999 |
| WO | WO 99/23828 | 5/1999 |
| WO | WO 2009/036176 | 3/2009 |
| WO | WO 2009/046268 | 4/2009 |

OTHER PUBLICATIONS

Reexamination Control No. 90/007520 dated Jun. 9, 2005 Reexamination of U.S. Pat. No. 5,949,331 issued to Schofield et al.
Reexamination Control No. 90/011478 dated Mar. 28, 2011 Reexamination of U.S. Pat. No. 6,222,447 issued to Schofield et al.
Reexamination Control No. 90/011477 dated Mar. 14, 2011 Reexamination of U.S. Pat. No. 5,949,331 issued to Schofield et al.
Wang G. et al. "CMOS Video Cameras" IEEE 1991 p. 100-103.
Ballard Dana H. et al. "Computer Vision" 1982 p. 88-89 sect. 3.4.1.
Article entitled "On-Chip CMOS Sensors for VLSI Imaging Systems" published by VLSI Vision Limited 1991.

* cited by examiner

VEHICLE IMAGING SYSTEM

CROSS REFERENCE TO RELATED APPLICATIONS

The present application is a divisional application of U.S. patent application Ser. No. 12/508,840, filed Jul. 24, 2009, which claims the benefit of U.S. provisional application Ser. No. 61/083,222, filed Jul. 24, 2008, which are hereby incorporated herein by reference in their entireties.

FIELD OF THE INVENTION

The present invention relates generally to vehicle imaging systems.

BACKGROUND OF THE INVENTION

Vehicle vision systems or imaging systems are known. Examples of such vision and/or imaging systems are described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties.

SUMMARY OF THE INVENTION

According to an aspect of the present invention, a vehicle vision system for a vehicle includes an image sensor having a forward field of view for capturing image data of a road surface forward of the vehicle and an image processor processing the image data. The vehicle vision system determines at least an estimate of a traction condition of at least a portion of the imaged road surface.

Optionally, the vehicle vision system may use the estimated traction condition (such as a friction condition, such as a state of friction or state of traction or coefficient of friction or the like) estimate of an upcoming road surface and may estimate a targeted separation gap between the host vehicle and a leading vehicle, and optionally the targeted separation gap may be adjusted and estimated based on a current driving condition. Optionally, the vehicle vision system may adjust the targeted separation gap based on the driving capabilities of the driver of the host vehicle.

According to another aspect of the present invention, a vehicle vision system for a vehicle includes an image sensor having a field of view and capturing image data of a scene exterior of the vehicle, a monitoring device monitoring power consumption of the vehicle, at least one lighting system that draws electrical power from the vehicle when operated, and an image processor that processes the captured image data. The electrical power drawn by the lighting system is varied at least in part responsive to processing of the image data by the image processor in order to adjust fuel consumption by the vehicle. The system thus may detect situations in which the vehicle lighting system can be turned off or operated under reduced power consumption in order to enhance the efficiency of the vehicle and enhance or maximize the miles per gallon of the vehicle during operation of the vehicle.

Optionally, the vehicle vision system may reduce the light generated by the vehicle lighting system in areas where it is determined that less light is desired or needed while maintaining or directing light at areas where it is determined that light is desired or needed. Optionally, the image sensor may have a forward field of view and may capture image data of a scene forward of the vehicle and in the direction of forward travel of the vehicle.

According to another aspect of the present invention, a vehicle vision system for a vehicle includes an image sensor and image processor. The image sensor has a field of view exterior of the vehicle for capturing image data of a scene forward of the vehicle. The image processor processes the image data and the vehicle vision system may detect and identify animals on or at or near the road and generally forward of the vehicle, and the system may distinguish the presence of a live animal from a dead animal within the field of view. The system at least one of (a) generates an alert (such as responsive to detection and/or identification of a live or dead animal within the field of view), and (b) controls the vehicle to assist in avoiding a collision (such as with a detected and/or identified animal within the field of view).

Optionally, the system may be adaptable to the driver's assumption of risk when operating to avoid a collision with the animal or to continue on the vehicle's path of travel. Optionally, the system may be adaptable to react differently depending on the type of animal that is detected and identified. Optionally, the system may be adaptable to react differently depending on whether the detected animal is distinguished as a live animal or a dead animal.

Optionally, the vehicle vision system may comprise at least two image sensors having at least one of (a) a forward field of view and capturing image data of a scene forward of the vehicle, (b) a rearward field of view and capturing image data of a scene rearward of the vehicle and (c) a sideward field of view and capturing image data of a scene to the side of the vehicle. A display may display the captured images as a merged image with image stitching of the component images to minimize artifacts of image stitching.

These and other objects, advantages and features of this invention will become apparent upon review of the following specification in conjunction with the drawings.

DESCRIPTION OF THE PREFERRED EMBODIMENTS

Figure 1:
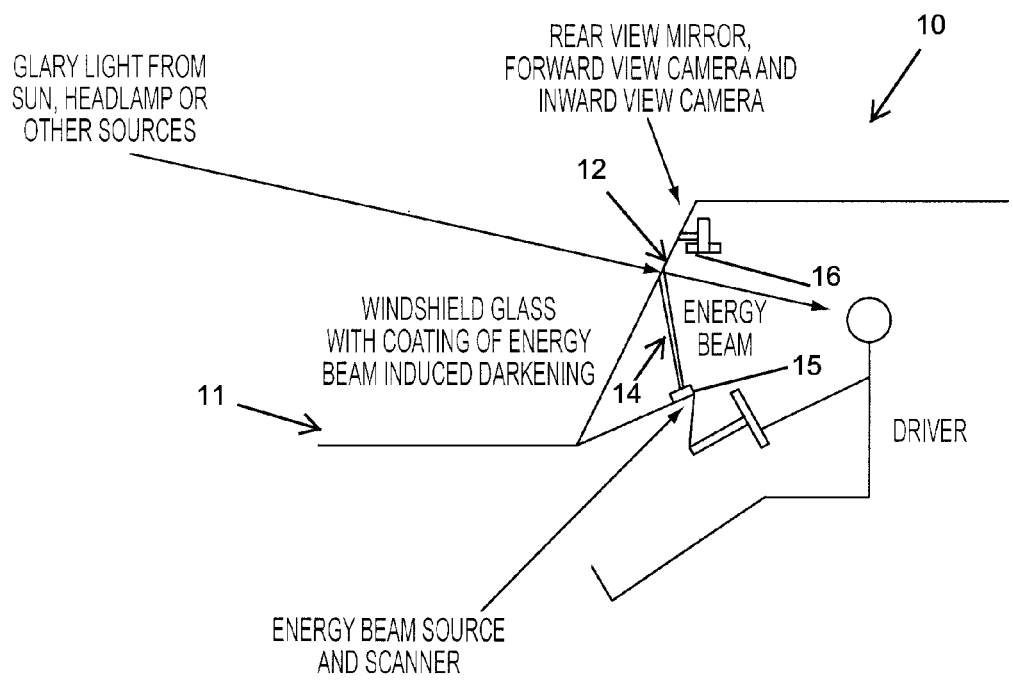
FIG. 1 is a schematic of a vehicle vision system, showing a windshield sun visor in accordance with the present invention.

Referring now to the drawings and the illustrative embodiments depicted therein, an imaging system (FIG. 1) is operable to provide a sun visor or light absorbing or light inhibiting element or device may be operable to block light from external to the vehicle, such as sun, sun reflections, headlamps from oncoming vehicles and other glaring light sources, while allowing other light to pass through the vehicle windshield. For example, a sun visor may be embedded in or on or at or near a windshield that can block sun light, headlamp light and/or other glaring light sources, while leaving the rest of the scene unblocked.

In the illustrated embodiment, a light blocking or light limiting device or system 10 of a vehicle 11 (FIG. 1) may comprise an addressable LCD type variable transmittance element or glass substrate or windshield portion 12 between the driver's eyes and the light source. The windshield thus may comprise a "transition lens" type windshield coating that is selectively darkened by a scanning energy beam 14 (such as an ultraviolet or UV scanning energy beam or an infrared energy beam or the like) and returns to normal clearness when the energy beam is turned off. The system may adjust or "darken" the windshield portion in response to a detection of a light source that is determined to be at a location where light from the light source may cause glare to the driver of the vehicle. The number and size of the "darken" areas on the windshield are determined by the number and the size of the glaring objects (sun, headlamps or other glaring sources), which can be determined by a forward facing camera 16 of a forward facing camera system such as described below. The size of the "darken" area on the windshield may also be determined by the driver's eye aperture size, which varies from a smaller area (such as about 2 mm or thereabouts) in brighter lighting conditions, to a larger area (such as about 8 mm or thereabouts) in darker lighting conditions. The windshield normally or can be designed to attenuate most of UV and IR wavelength bands. The windshield coating is preferably applied to the inner surface of the windshield so that the windshield serves as a cut-off filter to avoid the exposure of designated UV or IR from solar radiation and other external light sources, which may cause unintended "darkening" of the windshield. The windshield coating is only darkened by the energy beam emitted from the visor system and returns to its undarkened state when the energy beam is deactivated.

The energy beam system or device 15 may comprise a source device or devices, a scanner, or scanners, and optics that control the beam size and shape. The source may be a laser or a light emitting diode (LED) or the like, which emits an energy beam 14 that darkens the windshield coating. The location of device 15 may be any suitable location, and may be as shown in FIG. 1 or other convenient or suitable location. Preferably, the device may be located such that that the energy beam does not reflect from the windshield to the vehicle occupants' eyes or skin. The power density of the energy beam controls the darkness or the level of attenuation of the windshield coating. One may electrically control the power output level at the source. Optionally, one may control the duty cycle of pulse width modulation of the energy beam to control the power density at the windshield coating. The scanner may comprise 2 galvanometer scanning mirrors that scan the energy beam in the X and Y directions on the windshield, or a lens mounted on a 2-D scanning device that can deflect and scan the energy beam in the X and Y directions on the windshield, or the scanner may comprise any other suitable beam scanning means. Optionally, a digital projector-like energy beam system may be used, where a planar energy beam source, an addressable device (such as a liquid crystal device or micro mirror array or the like) and optics are used and which deliver and control the energy beams onto the windshield to form addressable darkened spots. An electric control module may be employed to control the address or coordinates and the darkness or attenuation level. This module may interface with or be a part of the central control module of the visor system.

The system may include an object detection device or system (such as a forward facing camera or image processor and associated processor or control circuitry) and a driver detection device or system, which is operable to determine the location of driver's head or eyes (such as via a stereo camera, a structured light and camera, and/or the like), whereby the system or systems may determine whether or not light from a detected light source may cause glare to the driver of the vehicle, and may determine the level of "darkening" or light attenuation needed, and the address or coordinates of the "darkened" areas. Spatial coordinates transformation and computations that involve measured angular coordinates of the glaring objects, the driver's eye position coordinates, the position of the cameras, as well as the position and angle of the windshield, will result to the output of the position of the "darkened" areas on windshield. Optionally, the travel direction or heading of the vehicle and/or a global positioning system may be used to determine whether a detected light source is at a location that may cause glare to the driver. Optionally, the system may determine the location or angle or setting of the vehicle mirrors to indicate or approximate the location of the head of the driver of the vehicle to assist in determining whether light from a detected light source may cause glare to the driver of the vehicle. Optionally, a forward facing camera or imaging sensor may capture images of the scene occurring forward of the vehicle that may encompass the sun and headlamps of oncoming vehicles. The system may distinguish detection of the sun as compared to detection of headlamps of oncoming vehicles because the sun is slow moving unless the vehicle is turning, while the motion of headlamps is faster when the headlamps are near to the host vehicle.

The image processor may process the captured images and may generate addresses or coordinates for the visor pixels and transmittance of light through the visor. Thus, upon detection of and identification of or recognition of a glaring light source (such as the sun or headlamp of an oncoming vehicle), such as in the forward path of the vehicle, the system may determine an appropriate window area that is to be "darkened" or that is to have a reduced transmissivity of light therethrough (such as an area or region of the windshield between the detected light source and the driver's eyes), and may actuate the energy source to scan or raster the energy beam across the appropriate window area to effectively darken the windshield at that area while allowing light to pass through the rest of the windshield substantially unaffected by operation of the energy source.

Optionally, for example, a window dimming device may comprise a window having at least a portion that is treated with a coating and an energy emitting device that is operable to emit energy toward a targeted region of the window. The coated portion of the window is selectively darkened by energy emitted by the energy emitting device. The energy emitting device may emit a scanning energy beam comprising one of an ultraviolet scanning energy beam and an infrared scanning energy beam. The window may comprise a window of a vehicle or other transparent or substantially transparent window or glass or polymeric substrate. The energy emitting device emits energy toward a selected portion of the window portion to darken the selected portion in response to a detection of a light source that is determined to be at a location where light from the light source may cause glare to a driver or occupant of a vehicle.

Optionally, the window darkening system may be suitable for use in non-automotive or non-windshield applications as well. For example, the system may be utilized at other vehicle windows, such as side windows or a rear backlite or a sun roof or the like). Optionally, it is envisioned that aspects of the darkening system may be suitable for use in or on eyeglasses (such as sunglasses or prescription glasses or the like). For example, the size of each blocking area may be approximate the aperture size of the human eye, and may vary from a smaller area (such as about 2 mm or thereabouts) in brighter lighting conditions, to a larger area (such as about 8 mm or thereabouts) in darker lighting conditions. Thus, a smaller number of addressable areas are needed in applications on glasses since glasses may only have about 25-30 units or pixels across their width and less units or pixels across their vertical dimension, whereby the maximum area (in pixels or units to be scanned or energized) may be less than about 500 area units for glasses. The eyeglasses of the present invention may have an energy beam system similar in concept to the windshield system of FIG. 1.

Optionally, for example, an eyeglass dimming device for eyeglasses may comprise an eyeglass lens or optic element (such as supported in an eyeglass frame for viewing through by a person wearing the eyeglasses) having at least a portion that is treated with a coating. An energy emitting device (that may be disposed at the eyeglasses, such as at the frame of the eyeglasses or the like) is operable to emit energy toward a targeted region of the lens. The coated portion of the lens is selectively darkened by energy emitted by the energy emitting device. The energy emitting device emits energy toward a selected portion of the lens portion to darken the selected portion in response to a detection of a light source that is determined to be at a location where light from the light source may cause glare to a wearer of the eyeglasses.

Optionally, the eyeglasses may have individually addressable elements, such as in liquid crystal displays similar to computer laptop displays, or such as in spatial light modulators. With such addressable elements in the eyeglasses, the energy beam system is not needed. Such dimmable or selectively darkenable sunglasses may be suitable for driving glasses and/or for some sports glasses, such as, for example, golf glasses (where the glasses may be selectively dimmed to reduce glare from the sun when the golfer looks up to follow the flight of the ball, but the rest of the glasses are not dimmed or darkened to allow the golfer to follow the flight of the ball when it is not between the sun and the golfer's eyes) or the like.

Optionally, for example, an eyeglass dimming device for eyeglasses may comprise an eyeglass lens or optic element (such as supported in an eyeglass frame for viewing through by a person wearing the eyeglasses) with addressable elements. The addressable elements are selectively darkened by the eyeglass dimming device (such as an electronic control or the like that may be disposed at the eyeglasses, such as at the frame of the eyeglasses or the like) in response to a detection of a light source that is determined to be at a location where light from the light source may cause glare to the eyeglass wearer.

Optionally, an imaging system of the present invention may include multiple headlights, such as multiple forward facing light emitting diodes (LEDs), where the intensity of the LEDs can be controlled so that a machine vision system can see the light variations emitted by the LEDs, while a human may not discern such variations. Typically, humans cannot see more than 60-70 Hz variations and for isolated flashes humans typically can sum photons up to 100 ms. Thus, the system may selectively energize or activate the LEDs so they blast or emit light at short intervals (faster than the threshold rate at which humans may detect the flashing of the lights) and humans may not see or discern the blast from the overall illumination integrated at slower time intervals. Thus, the system can blast or emit light forwardly of the vehicle and may detect or see a substantial increase or rise in reflected light as captured by a forward facing camera or imaging system, and if done at a high enough rate or a short enough blast or interval, a human cannot see or discern the presence of the blast of light. The system thus may provide an easy way to see if detected light sources or items (in images captured by the camera or imaging sensor) are reflective items or objects (such as signs or the like) or light sources (such as headlamps of oncoming vehicles or tail-lights of leading vehicles or the like). Such a system may be suitable for use in intelligent headlamp control systems and/or other automotive vision tasks for machines.

Optionally, the system may utilize super-fast lighting for the machine vision system to "learn" the environment without alienating the driving public (such as drivers of other vehicles on the road with the host vehicle). Optionally, the system may utilize different lights (such as different colored lights), and may use lights that, when energized together, sum perceptually to a white colored light, but that may flash different color components that would be discernible to machine vision while being imperceptible or not readily discernible to the human eyes.

Optionally, and although some regulatory constraints exist, the system may utilize multiple LED headlights, whereby the headlight orientation and intensity can be controlled quickly by the vision or imaging system. This allows the vision system to provide enhanced illumination when desired and may reduce or increase lighting of respective regions in response to various inputs, such as inputs from an object detection system or the like. The system thus may be operable to increase or reduce the intensity of the headlights as desired or appropriate, and the lights may be controlled to provide a tailored illumination of the area forward of and/or sideward of the vehicle. For example, the lights may be selectively activated or energized and/or aimed to illuminate the area forward of the vehicle, while substantially not illuminating or directing light toward areas where other vehicles are located (such as an oncoming vehicle or a leading vehicle on the road with the subject or host vehicle).

Such a tailorable lighting or vision system (which may adjust the direction of the lighting in response to a forward facing camera that detects objects or vehicles in front of the host vehicle or a gaze detection device that detects the gaze direction of the driver of the host vehicle and adjusts the headlights accordingly, such as by utilizing aspects of the systems described in U.S. patent application Ser. No. 12/171,436, filed Jul. 11, 2008 by Higgins-Luthman et al. for AUTOMATIC LIGHTING SYSTEM WITH ADAPTIVE ALIGNMENT FUNCTION, published Jan. 15, 2009 as U.S. Patent Publication No. US2009/0016073; and U.S. provisional application Ser. No. 60/949,352, filed Jul. 12, 2007, which are hereby incorporated herein by reference in their entireties) may provide enhanced or targeted illumination and may provide enhanced safety for the driver and passenger(s) of the host vehicle, pedestrians, other vehicles, and/or animals, and may enhance the detection of objects or obstacles or road irregularities on the road surface on which the host vehicle is traveling. Optionally, an output of the vision system may provide an input for vision systems of other vehicles.

Optionally, it is envisioned that, by selectively activating and deactivating some of the light sources and selectively increasing and decreasing the intensity of light sources so as to not constantly brightly illuminate areas that are not of interest to the driver of the vehicle, the vision system may provide a reduced power consumption by the vehicle during operation of the headlights as compared to operation of conventional headlamps. For example, a 4-10 percent power consumption loss (or thereabouts) with the lights on may result in a 4-10 percent increase (or thereabouts) in fuel efficiency for the host vehicle, while driving at night. This may be a significant improvement to vehicle manufacturers or owners/operators of fleets of vehicles or truck companies or the like, and may assist the vehicle manufacturers in meeting increased Corporate Average Fuel Economy (CAFE) requirements. Also, by reducing the light emitted by the vehicle headlights when it is not needed or even desired, the overall "light pollution" may be reduced.

Optionally, for example, the vehicle includes at least one lighting system that draws power from the vehicle when operated and the vision system may include a monitoring device that monitors the electrical power consumption of the lighting system and/or vehicle. The image processor may process captured image data and may detect situations in which the vehicle lighting system can be turned off or operated under reduced power consumption in order to maximize the fuel efficiency or miles per gallon of the vehicle in a safe manner without reducing the light output in a way that may adversely affect the viewability of the scene by the driver. The electrical power drawn by the at least one lighting system thus may be varied (such as reduced) at least in part responsive to the image processor in order to adjust (such as reduce) fuel consumption by the vehicle.

The vehicle vision system may reduce the light generated by the vehicle lighting system during driving conditions when less vehicle lighting is desired while directing light at areas where it is determined that light is desired. Optionally, the image sensor may have a forward field of view and may capture image data of a scene forward of the vehicle and in the direction of forward travel of the vehicle. The system may control or reduce fuel consumption, such as gasoline consumption or electrical power consumption (such as for an electric vehicle or the like) or other types of fuels utilized for operation of the vehicle and/or lighting system. Optionally, the system may control or reduce or minimize vehicle emissions responsive at least in part to the image processor.

Optionally, the vision system may detect ice or water in or on the road surface in front of the vehicle. For example, the vision system may utilize aspects of the systems described in U.S. patent application Ser. No. 11/948,086, filed Nov. 30, 2007, which is hereby incorporated herein by reference in its entirety, and may warn the driver of hard to see black ice. Optionally, such a system may measure water depth. Optionally, the system may be operable to identify the road surface (such as asphalt, concrete, metal, rain, snow, ice, water or the like) ahead of the vehicle and on which the vehicle is traveling and any associated road surface coatings, such as via processing image data captured by a forward facing imaging sensor or the like, and may determine (such as via a look up table or database) at least an estimate of a traction condition of or a friction condition of or the coefficient of friction for that road surface and/or coating or a portion of the road surface ahead of the vehicle. For example, if the system determines that the upcoming surface looks just like the current surface did, the system can determine that the traction condition or coefficient of friction will probably be the same as it was for the current road surface. If, on the other hand, the system determines that the upcoming road surface (or at least a portion thereof) looks different, the system can prepare for different traction on the upcoming surface as compared to the current traction. The system may adjust a traction control system or cruise control system or may generate an alert to the driver of the vehicle responsive to a detection of a change in traction or traction condition on the road surface ahead of the vehicle.

Optionally, the system may use estimates of the host tire contribution to the traction condition or coefficient of friction when calculating or estimating the traction condition or coefficient of friction between the vehicle tires and the road surface. Optionally, the vehicle may estimate the traction condition or coefficient of friction or change in the traction condition or coefficient of friction based on a detection of movement of other vehicles or objects on the road surface. For example, if the vehicle is traveling on a curve and a leading vehicle moves in a manner indicative to a skid or slide, then the system may determine that the traction condition or coefficient of friction may be reduced ahead of the host vehicle.

Optionally, the system may calculate or determine the traction condition or coefficient of friction by using the relationship between water, ice, road surface, speed and coefficient of friction. For example, the stopping distance is related to square of the vehicle speed and the coefficient of friction. The stopping distance gets worse (larger or longer) with increased speed. The stopping distance is inversely related to the coefficient of friction. Optionally, the system may have a table and/or calculation database embedded in the processor to assist in determining the traction condition or coefficient of friction.

The vision system may be operable to identify the water, snow and/or ice up ahead as well as near the tires of the vehicle. Because antilock brakes can be worse than standard brakes if snow or gravel piles into a dam when brakes lock up, it is beneficial that the vision system may be operable to identify such build up of snow or gravel in front of the vehicle.

Systems for estimating the coefficient of friction are generally for the tire road interface during actual braking. While this may be helpful (such as for antilock braking systems), it is still a reactive process. Knowing the depth of water and ice on an upcoming road surface would allow preparation of the braking system, and an equivalent risk of collision gap could be set for adaptive cruise control systems. For example, the stopping distance can be altered by a factor of 2 or 3 or more by knowing the conditions of the road ahead. Although better brake reactions are good, predictive knowledge is better.

Optionally, the vision system may be operable in conjunction with an adaptive cruise control system. Optionally, the adaptive cruise control system may function to keep or maintain the gap between the host vehicle and the leading vehicle at a substantially constant time to collision standard or a separation distance standard. Optionally, the vision system may use the traction condition or coefficient of friction measures ahead of the host vehicle to change the separation gap based on a determined or calculated or estimated stopping distance (based on the speed of the vehicle and the traction condition or coefficient of friction of the road surface ahead of the vehicle).

Optionally, the vision system may utilize measures of driver capability (in-vehicle), a template drive over golden routes, visibility, threat measures and/or the like to adjust or tune the stopping and steering distances for adaptive live measures rather than pre-set values. For example, the system may adjust the traffic gap or separation distance as a function of a predetermined standard traffic gap as a standard safety margin by a standard driver and vehicle, such as a young driver with clear, 20/20 color vision, and normal visual threshold and contrast and reaction time for different contrast color brightness, and the like. For example, the system may compare the host vehicle driver to the standard driver and adjust the separation gap or time to collision accordingly.

The stopping distance and/or separation gap may be calculated or determined or estimated as a function of the traction condition or coefficient of friction, the driver's reaction time, the visibility of the leading vehicle or object or obstacle in front of the host vehicle, the time of day, any indications of driver alertness, the separation gap between the host vehicle and the detected object or leading vehicle, the tire tread of the vehicle's tires, other cars in a cocoon multi-axis accelerometer, and/or the like. Such information may be gathered by and/or utilized with various vehicle systems, such as an adaptive cruise control system, an intelligent headlamp control system, a forward facing camera, forward collision warning (FCW) system a blind spot detection/lane change aide (BSD/LCA) system, a reverse facing camera, or a side mounted camera looking downward near parking areas (such as used in Japan), a global position system (GPS), a temperature sensor, a humidity sensor, a traction condition or coefficient of friction detection or determination and/or other information for upcoming vehicles, an electronic stability control, an internal driver view, a miner's light and/or the like. Optionally, the stopping distance could be fed into an intelligent transportation system (ITS) in a weighted sum of leading vehicles and this closeness to next vehicles could be fed back into ITS but also into a center high mounted stop lamp (CHMSL) type light or brake light steganography for other vision systems. If the host vehicle has a vision system then it should monitor the driver and the environment so that other vehicles are warned if unsafe actions are going to occur, or probably or possibly going to occur. Optionally, if the host vehicle has a miner's light then the light may be adjusted or directed to provide enhanced light on areas of concern.

Optionally, vehicles for handicapped drivers may be extended because all drivers at various times are handicapped or challenged. For example, the vision system may detect characteristics of the driver that may be indicative of the driver being inattentive, drowsy, under the influence of substance use, bored, young/old, healthy, having less than 20/20 vision, color deficient, poor field of view, poor contrast sensitivity, poor clutter analysis, poor reaction time, poor car maintenance, or encountering a challenging environment, such as rain, snow, fog, traffic in cocoon, safe space around car, poor lighting, unsafe area-past accidents, icy conditions, curves, intersections and/or the like. The driver assistance system may tend to make each driver have at least a minimum standard of equivalent safety margin, until such time as there exists totally automatic traffic. Optionally, the system may inform or alert other drivers of a probability that the driver of the host vehicle is potentially less than a standard driver in semi-objective ways, such as via communication of such information via a wireless communication or steganographic lighting communication or the like. For example, a normal 60 meter gap is a 2 second gap between vehicles traveling at 65 mph, but a slower reaction time of older driver and probability of ice makes the gap for a forward collision warning to be about 120 meters. The forward collision warning system if detecting a gap at less than a threshold level (based on the particular driver and driving conditions), such as less than about 0.7 of the calculated or determined gap (such as 120 meters for the given example), may provide a warning or alert to the driver of the host vehicle, or may provide a steganographic warning to the leading vehicle so that the leading vehicle may relay a warning back to the driver of the host vehicle, such as through the leading vehicle's CHMSL brake light or the like. In such a situation, the standard 60 meter gap is less meaningful since what is truly desired is that the particular driver of the vehicle keeps the gap to the leading vehicle in such a way that the driver can stop safely if the leading vehicle suddenly decelerates or brakes. This depends upon how good the driver is and how good the vehicle is at stopping and a blanket 60 meter distance obscures all these individual differences.

Thus, the camera in the host vehicle can measure different contrast color brightness, direction, a number of items in the field of view and/or the like. When the automatic control systems are disabled, an advanced vehicle system can measure or determine the reaction time for various driver activities. For example, high-low beam switching, average forward collision distance, blind spot detection, braking time, relative vehicle positioning within the host vehicle lane as measured by a lane departure warning systems (LDW), steering wheel movements, and following capability may be determined by the vision system and compared to the "standard driver". The determination of driver capability may be communicated ostensibly or steganographically to ITS systems and/or other systems or entities. Optionally, for example, such data can be relayed to driver license bodies and to other drivers and to the driver himself/herself.

Optionally, the system may adjust automatic controls or the like to match the driver if desired. For example, intelligent headlamp control (IHC) detection distance can be shorter or longer based upon how driver behaves—such as for applications where the control or behavior is a matter of preference and not safety. Optionally, some applications will not match driver, but compensate for driver deviations from standard, and may make all drivers generally equally (or similarly) safe, even if the particular driver has defects of driving deficiencies.

Optionally, the system may assist beginning and senior drivers, such as by utilizing traffic sign recognition (TSR), IHC, LDW, adaptive cruise control (ACC) and/or GPS navigating to monitor the behavior of the driver, and score it along multiple risk dimensions so that the car can behave like a normal car, or more nanny-like (such as for training of the driver or easing the driving for the more handicapped or deficient drivers). For example, teenage drivers typically have good perception, poorer judgment, and quick reflexes, while seniors typically have poorer perception, slower reflexes and better driver learning but are sometimes forgetful and have worse workload performance. The purchaser of the vehicle (or of an aftermarket or add-on feature to a cell phone or on aftermarket vehicle system) may want to continue the "nanny-ness" over the teenage driver even when the parent exits the car, and may want to have the elderly parent continue semi-independent driving as long as safely possible. Thus, the system may have an override feature, but that feature may be turned off or not available for some drivers of the vehicle.

Optionally, beginning and senior drivers could use an adaptive record of how to drive standard routes and commutes. For example, GPS, start and end choices, and TSR allow overall route identification. The driving record by average of trips or a "golden drive" by a good driver leads to a record of speed, acceleration and braking, lane deviation from center, typical IHC dimming distances, coefficient of friction interaction with precipitation (traction and rain sensor), and this may be extended to an ACC system to allow measurement of any deviation from a benchmark drive so that performance of a suboptimal driver can be identified so that the vehicle risk management behaviors can be tailored for the current driver. Such records could be sent to parents and adult children for monitoring of driver performance.

Optionally, inside monitoring of passenger count could bias risk management for teenage drivers (who typically drive worse with more passengers in the vehicle). Optionally, the system may alert the driver of such driving deficiencies or deviations from the expected or targeted performance. The system may use optimally perceived warnings for teenage drivers (who may hear higher frequencies so that they alone will be warned, but nearby adults will be spared the sound).

Optionally, the vision system may be operable to detect animals or objects in the road or path of travel of the host vehicle. For example, the system may detect animals, both live and road-kill, and may identify the animals based on expected behavior patterns and size/shape of animals (such as determined from an animal database). Thus, the system may, for both large (deer) and small (pets) animals, provide optimum detection and evasive action, such as by detecting deer in air for pre-collision settings and by detecting static road-kill and moving live animals, and providing an analysis of hit versus drive-over animals and dodge probabilities versus driver risk preferences, as discussed below. For example, pet lovers and vegetarians may choose more risky maneuvers to avoid animal impacts, while hunters may simply want to maximize driver safety with less risk, and without as much concern for the animal.

Figure 2:
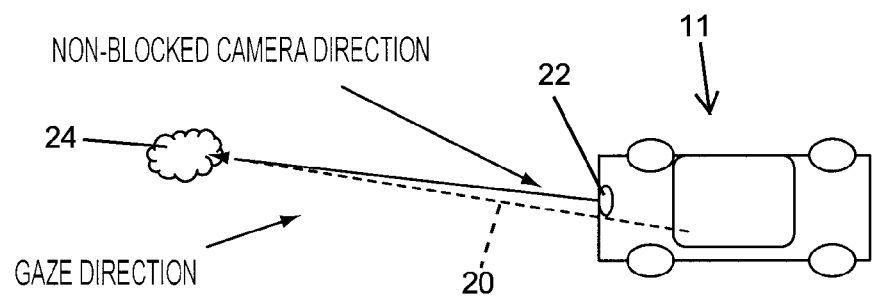
FIGS. 2 and 3 are schematics of a vehicle vision system, showing an animal detection system in accordance with the present invention.

The vision system may use laser line patterns and triangulation to detect animals and/or the like, such as by utilizing aspects of the machine vision of upcoming road surface for predictive suspension described in U.S. patent application Ser. No. 12/251,672, filed Oct. 15, 2008, and published Apr. 16, 2009 as U.S. Patent Publication No. US2009/0097038; and U.S. provisional application Ser. No. 60/980,265, filed Oct. 16, 2007, which is hereby incorporated herein by reference in its entirety. Such a system may provide localized accurate sensors for ranges less than 6 meters. Optionally, and with reference to FIG. 2, the vision system of a vehicle 11 may detect the driver's gaze direction 20 and a forward facing camera 22 of the vehicle 11 may be aimed in that direction to capture images of the object or animal 24 that the driver is looking at, whereby the image data may be processed to detect and identify the object or animal and to control the vehicle or provide an alert accordingly. The vision system may provide the potential for detecting and identifying animals as a special case of a bump (some detected "bumps" may be dead or live animals) in the road, and may provide the potential for long range detection and identification of larger animals within standard vision scene. Optionally, the system may be operable to distinguish dead animals from live animals (live animals move while dead animals do not, and live animals are warm and dead animals typically are not; and this may be detected by a heat sensing device or visible or near-infrared or thermal-infrared sensors or the like). Thus, the vision system may detect and identify animals on the road or in the path of travel of the vehicle, and may provide an alert or may take evasive action to avoid the detected animal.

Figure 3:
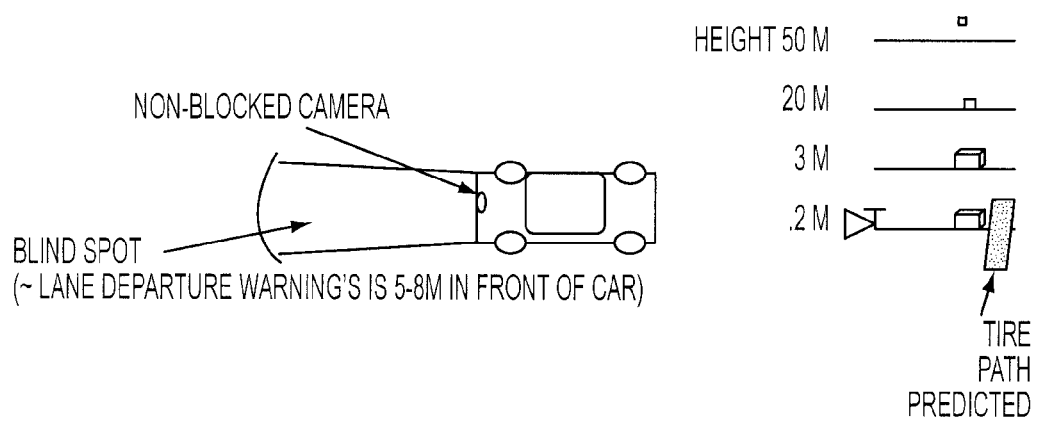
Figure 4:
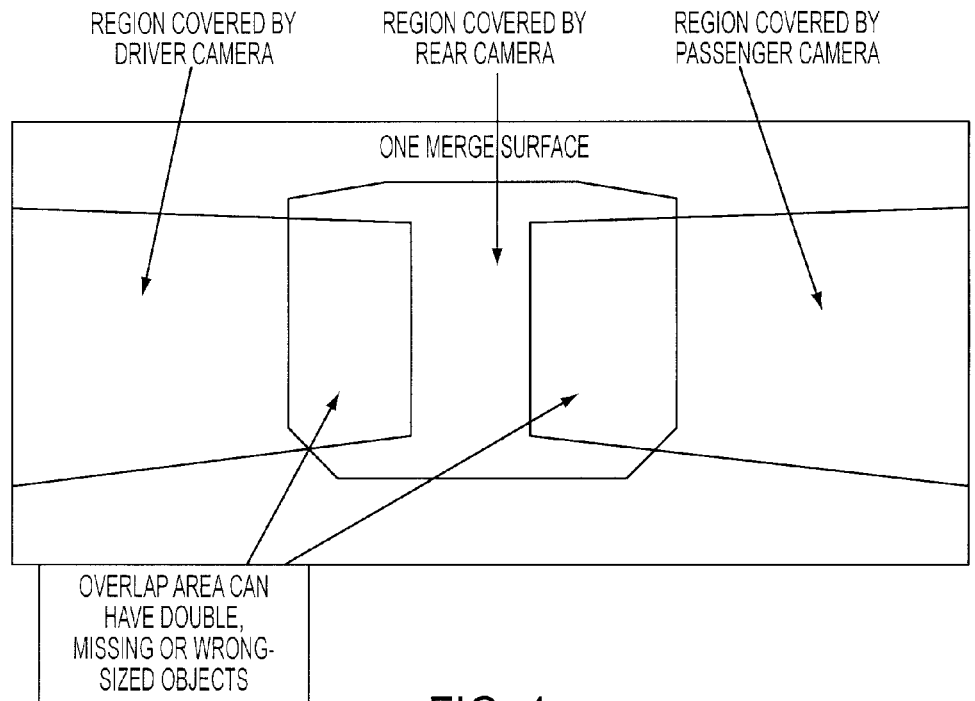
FIGS. 4-14 are images representative of a vehicle vision system that is operable to merge images from two or more cameras in accordance with the present invention.
Figure 5:
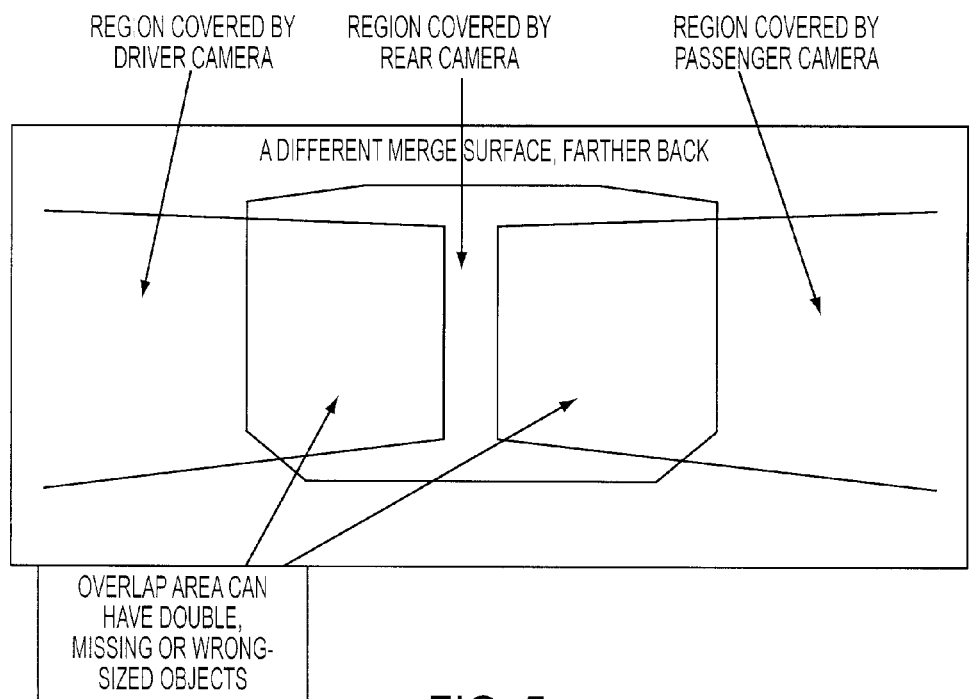
Figure 6:
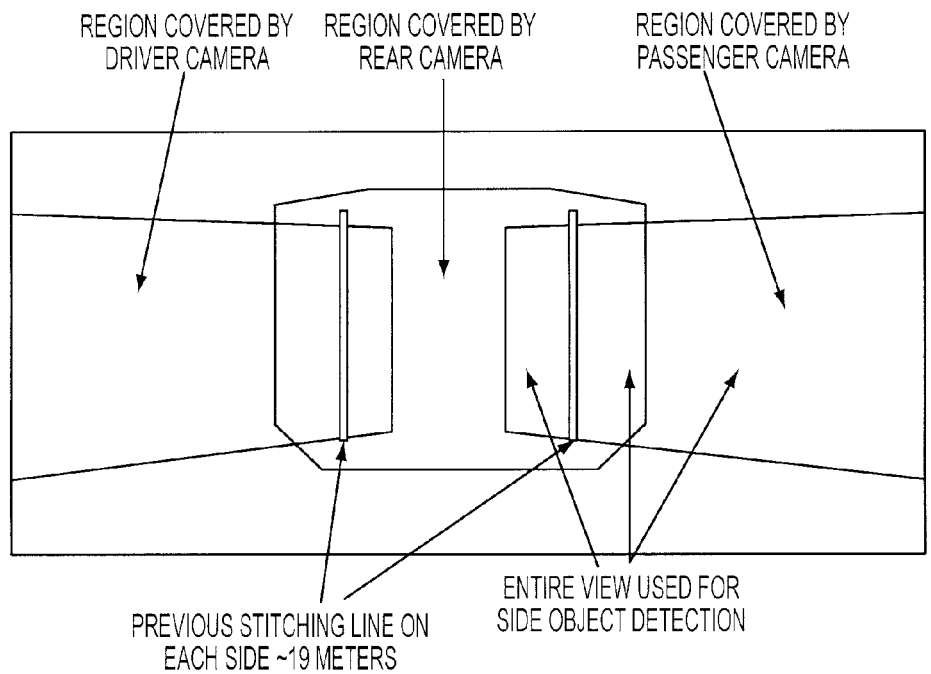
Figure 7:
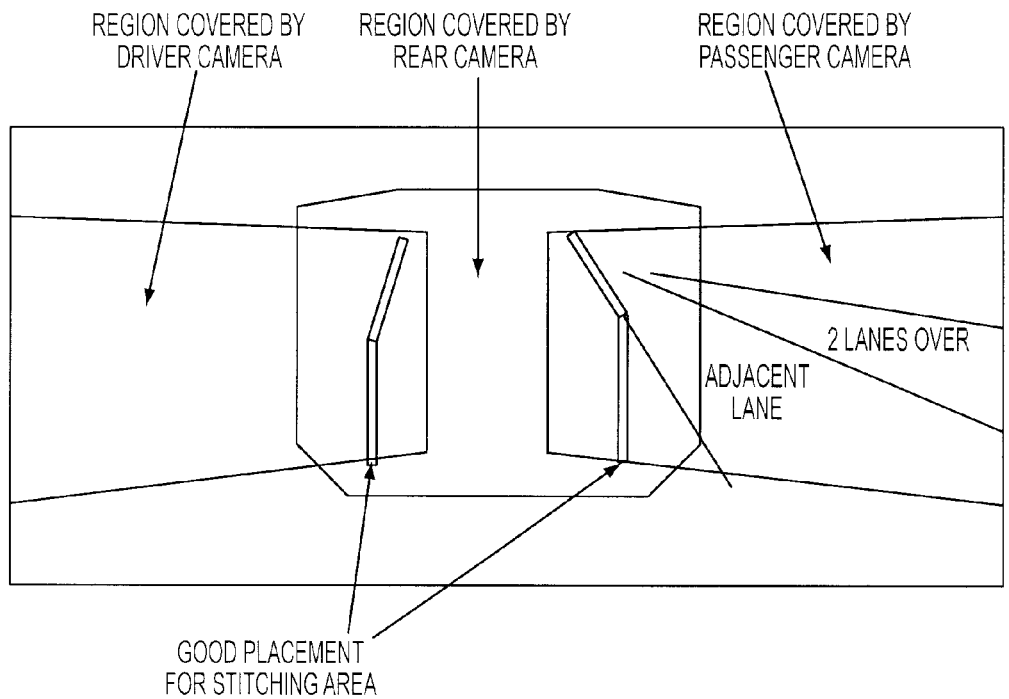
Figure 8:
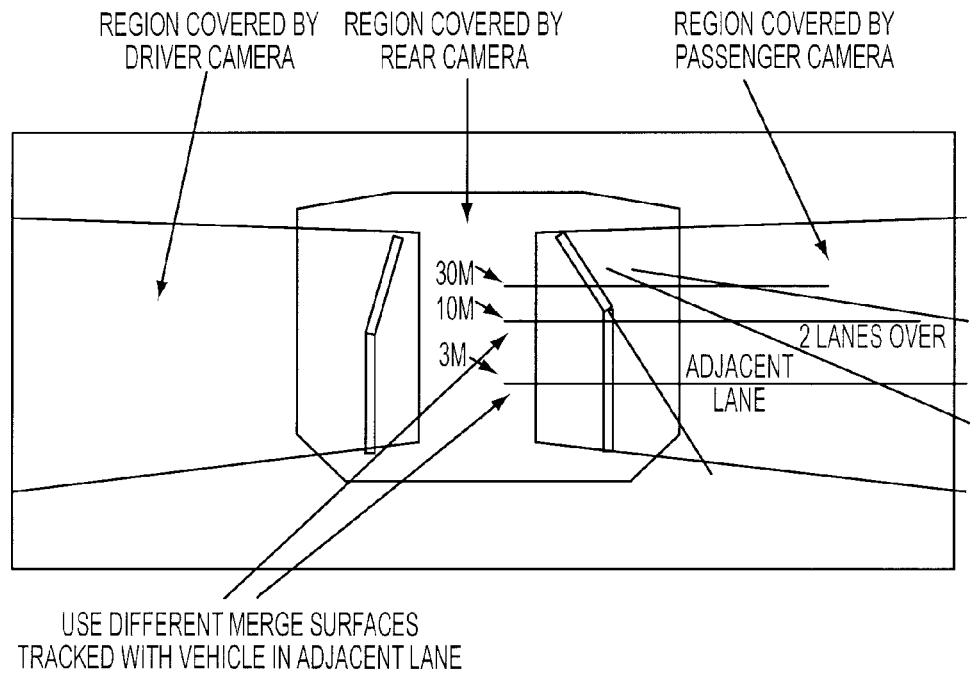
Figure 9:
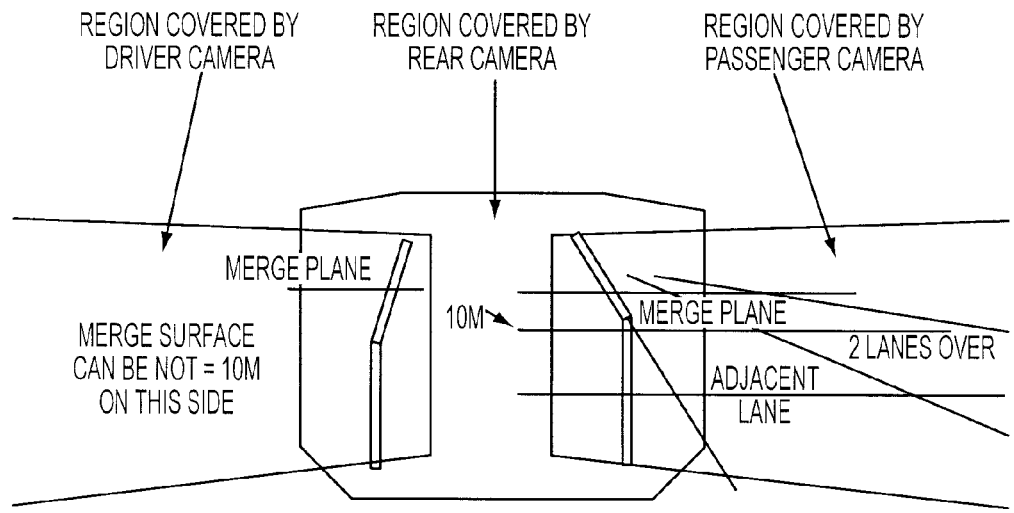
Figure 10:
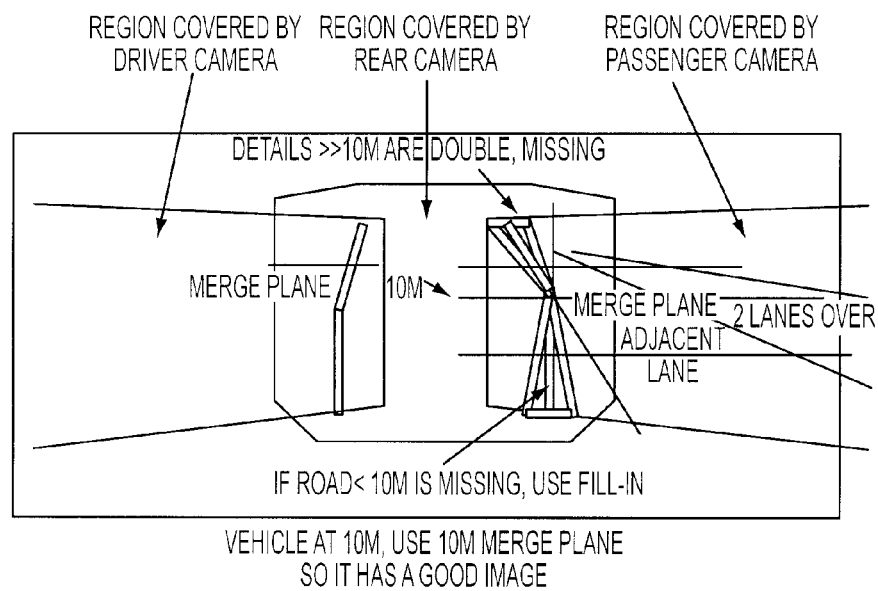
Figure 11:
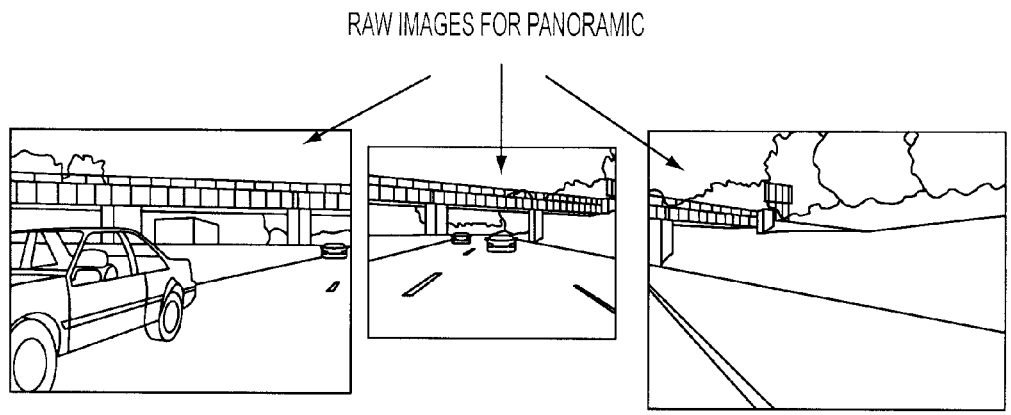
Figure 12:
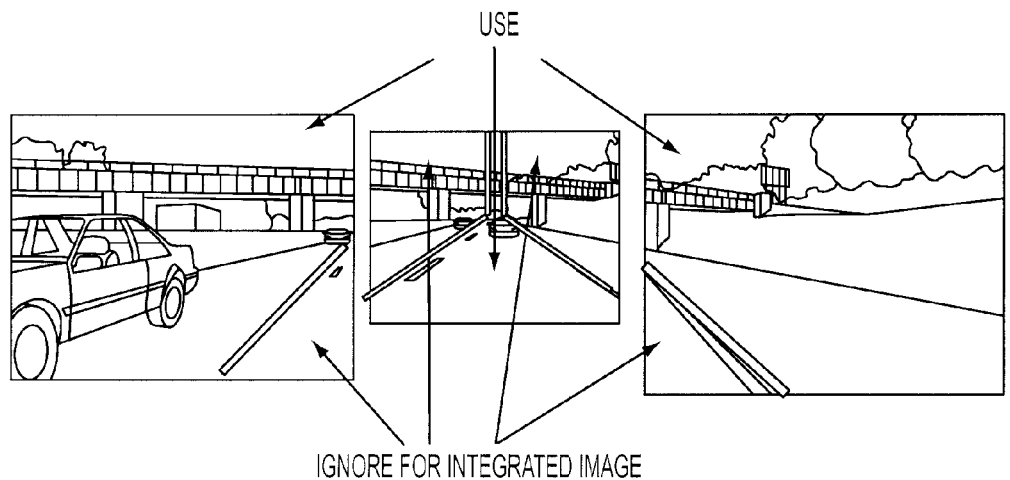
Figure 13:
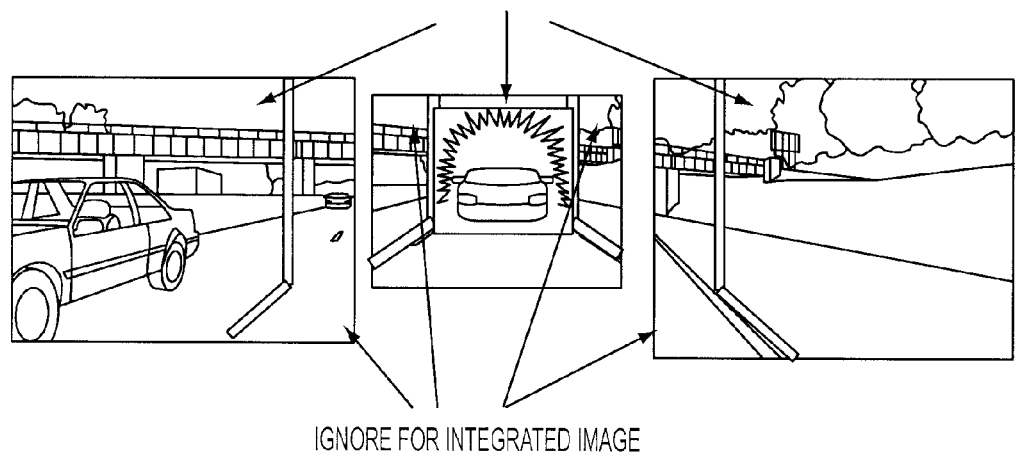
Figure 14:
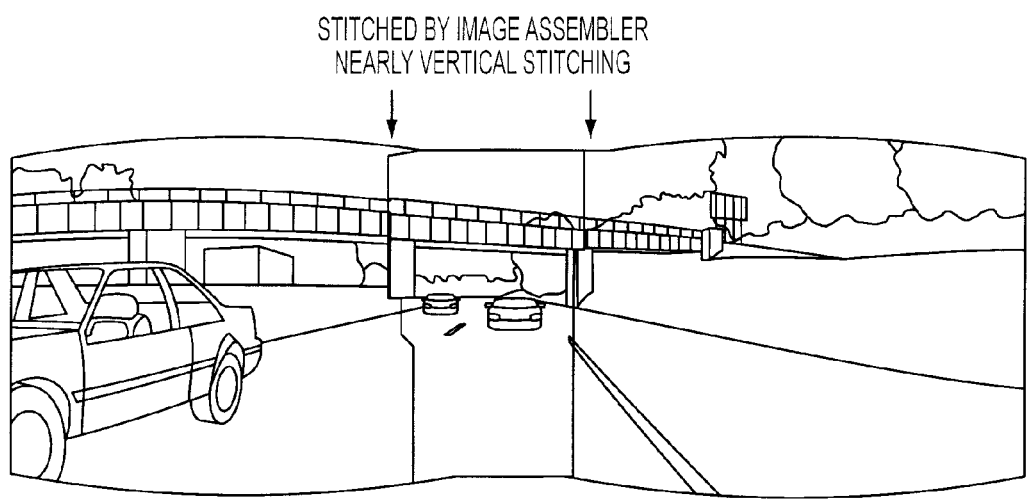

Optionally, the vision system may detect and identify animals, such as dead animals by comparing image data of a detected object (indicative of the size, shape, height, color, profile, and/or the like of the object) to a data base of dead animal profiles (such as profiles of dead animals as viewed at high speed by drivers). Optionally, and with reference to FIG. 3, the system may determine the size of the object or animal by processing image data over time, and may match the height of the object (such as the height or location of the detected object in the images captured by the forward facing camera) and the tire location so that evasive action could be programmed into the active steering and braking for minimal interruption and risk to driver's path. For example, when a detected object on the road surface is about 50 meters in front of the equipped vehicle, the location of the object may be at one height and position in the captured images, and as the vehicle approaches the detected object, the object in the images captured by the forward facing camera may lower toward the road surface and increase in size, and such position at the road surface may be compared to the tire position of the equipped vehicle to determine if evasive action is necessary or desired. Such a determination of evasive action may be responsive to the detected location and/or size of the detected object and/or the steering angle or vehicle path of the equipped vehicle. As shown in FIG. 3, the area about five to eight meters immediately in front of the vehicle may be a blind zone or area where the driver may not readily view the road surface along which the vehicle is traveling. The system thus may determine the predicted path of the vehicle's tires to determine if the tire or tires may impact the detected object (that may not be visible to the driver as the vehicle further approaches the object).

Optionally, the vision system may detect and identify live animals by comparing image data of a detected object (indicative of the size, shape, height, color, profile, and/or the like of the object) to a data base of live animal profiles (such as profiles of live animals as viewed at high speed by drivers). The database may include data pertaining to probable animal movements, locations of animals, probable animal reactive movements after animal gets closer to an approaching vehicle. The system may provide static obstacle vehicle countermeasures from the dead animal scenario.

Optionally, the vision system may be responsive to a user input, whereby the driver of the vehicle can input the utility function tailored for their preferences. For example, the driver could select a level of risk that is acceptable to the driver in order to miss a detected animal. For example, some people may take no risk to avoid hitting a small animal, but may tolerate an increase accident risk level to avoid a collision if the animal in the path of the vehicle is identified as a dog or cat. Typically, a driver may take risks to avoid collisions with large animals, such as deer. If the system determines that a collision is imminent, then the system may trigger the vehicle's mitigating behaviors.

Optionally, the vision system may differentiate or distinguish between animal detection and pedestrian detection. For example, the animal detection system may detect erect, moving and dead/injured beings, and a pedestrian detection system or subsystem may be targeted for detected erect pedestrians. The vision system may take recommended actions in response to detection of an object or animal, and the actions may be different depending upon the vehicle speed, collision probability, size of the detected animal, driver preferences, legal preferences, kind of animal, and whether or not the animal may be a human. Optionally, the system may be adaptable for rules or regulations of the governmental or regulatory bodies of the region in which the vehicle is traveling, since governmental and/or regulatory bodies may mandate evasive actions and risky behaviors for different animals. For example, in India, the system may be tailored or adapted to avoid hitting cattle in order to protect cattle, while in Australia, the system may be tailored or adapted to avoid hitting koalas and/or kangaroos, while in the United States, the system may be tailored or adapted to avoid hitting common pets. Thus, the vision system offers an objective way to accommodate regulations which vary from place to place. Optionally, a vehicle-based global positioning system (GPS) could activate different system actions related to protected animals in the region/regions in which the vehicle is traveling.

Optionally, the vision system may include a rearward facing camera or image sensor and may be used in conjunction with a back up assist system or reverse aid system or rear vision system or the like. The system may include a display device or display screen for viewing by the driver of the vehicle, and may provide a graphic overlay (such as by utilizing aspects of the systems described in U.S. Pat. Nos. 5,670,935; 5,949,331; 6,222,447; and 6,611,202, and/or PCT Application No. PCT/US08/76022, filed Sep. 11, 2008, and published Mar. 19, 2009 as International Publication No. WO2009/036176; and/or U.S. provisional application Ser. No. 60/971,397, filed Sep. 11, 2007, which are hereby incorporated herein by reference in their entireties) at the displayed image to enhance the driver's viewing and understanding of the displayed image. Optionally, and desirably, if the vehicle is not in reverse gear position, the graphic overlays are not presented. Optionally, the system may detect the contrast of an image or a graphic overlay at the image and may adjust the contrast sensitivity (which depends on the surroundings) of the display device. For example, the system may utilize different look-up-tables (LUTs) to map input gray levels to output gray levels. Because about 8 percent of the population has some defect or deficiency in color vision, the system may be operable to provide tunable settings to help the driver better see and view and discern the displayed image (especially for those people with more severe defects), so that the driver or person viewing the display may experience enhanced viewability and discernibility of the displayed image and/or may see and discern the graphic overlays better than with a standard contrast setting. Thus, the system may provide a display with tunable colors (such as for a three different color graphic overlay) so that the about 2-8 percent of the population that have color vision deficiencies do not see an overlay with brown and yellow only but will be able to see and discern the three different colors of the graphic overlay.

Optionally, the vision system may include or provide a detector/tracking system that detects an object rearward or to the side of the vehicle and that tracks the object or highlights the object at the rearview mirror (such as at the interior rearview mirror and/or the exterior rearview mirror or mirrors) so that the driver can readily see and discern the detected/highlighted object in the reflected image. Angularly adjustable mirrors mounted inside or outside a vehicle are normally positioned to display to the driver reflections of the vehicle's surrounding area. The vision system may provide overlaid patterns or lights that are made visible upon the mirror, or mirror boundary, into position(s) which indicate to the driver an object, or vehicle, or area that is a potential collision danger, or source of such dangers, to the vehicle. These areas could include the vehicle's "blind spots". The lights or patterns may be provided at regions outside of the viewing region or may be provided within the viewing region, such as via a display on demand type display through a transflective mirror reflector, so that the lights are viewable through the reflective element when the lights are activated, but are substantially not viewable or discernible through the reflective element when the lights are deactivated.

The machine vision or detector/tracking system guides the movement of the apparent position and visibility of the added artificial pattern or light to the driver. The vision system senses the presence and/or position and/or velocity of a possible collision-danger object near the vehicle. The system could also sense dangerous movements of the host vehicle, such as crossing lane markers. The vision system directs the light/pattern for the appropriate representation of meaningful information to the vehicle driver. This direction is guided by rules of thumb or other assumptions in lower cost systems up to advanced systems that actually measure where the driver's eyes are to place the patterns with high accuracy in the driver's field of view. The system may use human reaction times to signal light/pattern movements so that the driver can react to dangers appropriately.

The driver, by viewing the mirror from one head position, would see that the apparent location of the additional artificial light/pattern will "track" with the apparent location of the other real object, or vehicle, in the mirror. This is because the artificial light pattern will appear to move in synchrony with the mirror's reflection of the other object/ vehicle's apparent movement in the mirror scene, as viewed by the driver. After the system determines that the danger has passed, the artificial light/pattern can become invisible or not discernible to the driver.

Optionally, the vision system may be overridden by the driver, such as in conditions where the environment would normally trigger inappropriate light/pattern movements. Optionally, the light/pattern can appear to the driver to track the objects ideally, or it could partially track the objects in a weighted fashion. Partial tracking could protect against extreme apparent motions of the pattern, and also encourage some ergonomically recommended driver head movements, preventing inattention.

The vision system thus would provide enhanced viewing and recognition of detected objects at the inside and/or outside mirrors, such as for multiple blind spots, for more objects than just vehicles, for areas themselves, for tracking pattern movements, for binary pattern movements, for system tuning, and for ergonomic features. The binary pattern movements could move between two definite locations, each of which signals information to the driver, such as common versus potentially dangerous situations. The mirrors would be "assisting" the driver, in that they show to the driver scenes that the total system "believes" that the driver "should" see, before he or she acts unwisely.

Optionally, for example, a vehicle vision system may comprise an image sensor having a forward and/or rearward and/or sideward field of view and capturing image data of a scene forward and/or rearward and/or to the sides of the vehicle, an image processor processing the image data and detecting objects of interest, and a display displaying information to the driver of the vehicle using the interior rear view mirror and or the windshield as a display area without compromising the driver's field of view of the scene and keeping the driver's attention generally focused forward of the vehicle and above the dashboard and below the display. The vehicle vision system may be operable to highlight a portion of the display at or near the image of a detected object of interest and may track the image of the detected object of interest as the image moves across the display. The display may be disposed at a mirror reflective element of the vehicle and the vehicle vision system may highlight a portion of the display at or near the reflected image of a detected object of interest and may track the reflection of the detected object of interest as the reflected image moves across the mirror reflective element.

Optionally, aspects of such a vision system may be implemented into navigational displays using camera videos and graphical overlays. However, the use of the mirror itself (with the lights being at or behind the reflective element) provides all the dynamic range of a mirror, and all the resolution capability of a mirror. These ranges and resolutions are of optical quality, which may be orders of magnitude better than conventional navigational displays (such as CRT, LCD, and/or the like). In addition, the vision system encourages the use of present technology (rearview mirrors), which has been ingrained into generations of drivers.

The light/patterns can be at the border of a mirror, just slightly displaced from the apparent location of the "dangerous" object/vehicle. The light/patterns can also be presented to the driver in locations in the viewed mirror scene which are known to be background low-risk areas. These areas include the road surface just in front of the dangerous object/vehicle, and the sky area immediately above the object/vehicle. The added artificial information, if projected, can be presented in such a way that the optical path of the artificial information will give a similar optical path distance to the eye, so that the overlay information appears to be close to the same depth plane of the actual object/vehicle. The added artificial information can also be related to the actual object/vehicle so that, for example, sounds and flashing lights similar to a real police car could be overlaid upon the apparent visual scene in the mirror when a vehicle approaches at very high closing velocities. The vision system may present information to the driver, without requiring the driver to look, or hear, or respond in any different way than he or she normally would. The vision system may present the extra information in a manner similar to the driver's vast personal experience. The vision system thus of the present invention may allow all the current richness of driver experience, and present extra information in ways that minimize the cognitive, sensory, and motor load of the extra information to the driver's physical and mental processing capability.

Optionally, using the mirror positions, as set by the driver, allows a good estimation of the driver's eye positions. Knowing eye positions, mirror positions, along with the camera positions of the machine vision system, together with trigonometry calculations, allows a good estimation of the position of the driver-viewed reflection of the candidate object/vehicle in a mirror. Knowing the position of the object reflection location and the eye location allows the appropriate position of the overlaid light pattern to be calculated.

Optionally, a lower cost or inexpensive system may present the appropriate light/pattern in the mirror boundary close to the apparent location of the object/vehicle, while more advanced systems may present the additional light/pattern much closer, or actually surrounding, the detected object/vehicle's apparent location in the driver's field of view. Optionally, an even more advanced system may use a sensor (camera, radar, lidar, ultrasonic system or the like) to measure the real-time location of the driver's eyes (or driver's gaze direction). Optionally, the vision system could use an external driver-owned sensor system, such as the compressed video output from the driver's cell phone camera pointed at the driver, when placed in a docking cradle in the car. When using real-time information about the driver's changing eye position, if the driver moves, the apparent location of added artificial information as seen in the mirror, can move in synchrony with the apparent location of the targeted object/vehicle in the mirror.

Optionally, the system may adjust the angle or tilt or setting of the mirror reflector (such as the mirror reflector of an exterior side mirror) in response to an object or vehicle detection, in order to enhance the driver's viewability of the object and awareness of the detected object. An angularly adjustable mirror mounted inside or outside a vehicle is normally positioned to display to the driver reflections of the vehicle's surrounding area. The mirror may be temporarily angularly adjusted by a motor to be out of its normal position and into a temporary position(s) which display to the driver an object, or vehicle, or area that is a potential collision danger, or source of such dangers, to the vehicle. These areas could include the vehicle's "blind spots".

The motor or mirror actuator moves the mirror to potentially multiple positions and then back to the original position, responsive to signals from a detector/tracking system. The detector/tracking system could be a machine vision system or the like. The vision system senses the presence, and/or position, and/or velocity of a possible collision-danger object near the vehicle. The system could also sense dangerous movements of the host vehicle, such as crossing lane markers. The vision system signals the adjustable mirror, for the appropriate display of a candidate vehicle, or object, or dangerous areas, such as blind spots, to the vehicle driver. The system may use human reaction times to signal the mirror movements in sufficient time so that the driver can react to dangers appropriately.

The driver, by viewing the mirror from one head position, would be able to "track" the other object, or vehicle, because the mirror would move in such a way as to allow this "tracking" to occur. Also from one head position, the driver would be able to see dangerous areas, or not, as the mirror moves. After the system determines that the danger has passed, the mirror returns to its normal position. Optionally, the system may be overridden by the driver, such as in conditions where the environment would normally trigger inappropriate mirror movements. The system can track the objects ideally, or it could partially track the objects. Partial tracking could protect against extreme mirror motions, and also encourage some ergonomically recommended driver head movements, preventing inattention.

The vision system thus would provide enhanced viewing and recognition of detected objects at the inside and/or outside mirrors, for multiple blind spots, for more objects than just vehicles, for areas themselves, for tracking mirror movements, for binary mirror movements, for system tuning, and for ergonomic features. The mirrors would be adaptive or "intelligent", or "assisting", in that they show to the driver scenes that the total system "believes" that the driver "should" see, before acting unwisely. Optionally, an electrochromic (EC) mirror (that adapts to the light environment surrounding the vehicle), with angular adaptive capability, adapts to the environment of light, and objects, surrounding the vehicle, and may allow the driver to readily see the relevant environment, with minimal head movements, and/or minimal visual adaptation.

Optionally, the concepts of a vision system for enhanced viewing and recognition of detected objects as discussed above, with display at or near or around or overlaid on a rear-view mirror can also be applied to display systems for heads-up or larger displays at or on the windshield. These windshield displays can utilize forward facing imaging systems with machine vision of important or threat objects or objects of interest and may display icons or attention-getting patterns to the driver. Similar subsystems which monitor the driver's field of view can be utilized so that the windshield display enhances the driver's knowledge of the forward scene. Energy beam or projector-like systems as mentioned above with respect to the simulated visor system can be used to highlight relevant objects in the forward windshield scenes as viewed by the driver.

Optionally, the vision system may provide a panoramic display that combines or merges images from two or more cameras or image sensors (such as from a center, rearward viewing camera and two side, rearward viewing cameras) so the driver of the vehicle may view a single display that displays the area rearward and to the sides of the host vehicle. Such a vision system may utilize aspects of the systems described in U.S. Pat. Nos. 5,670,935; 5,949,331; 6,222,447; and 6,611,202, which are hereby incorporated herein by reference in their entireties. With reference to FIGS. 4-14, the vision system may perform an image stitching function to merge or stitch images together along a desired stitch or merge line or lines to provide an enhanced generally uniform merged image for displaying to the driver. The image stitching area should be adaptively placed, such as near a lane marker line in a side camera view. The system may utilize adaptive merge planes, or surfaces, using vehicle neighbors, and/or may use a merge surface intersecting side object detection algorithm distances for first vehicles in left, center, and right lanes. Objects farther away and road surfaces closer to the host may be double, missing or wrong sized, but this may only minimally affect the driver. This is because drivers typically track the nearby vehicles and mostly ignore the road in front of, and objects behind, the closest vehicle in the host's lane and adjacent lanes. The stitching area may change, depending upon visible vehicles and/or other detected objects.

The image stitching process may limit distortion of dominant objects, vehicles and lane markers. From the side cameras, the adjacent lane car images don't undergo cross stitching. Only closely following car sides may cross the default stitching area or lines. Each straight highway lane marker line may comprise an image taken from one of the cameras. The default stitching may be just outside the host lane marker lines for all cameras. In the illustrated embodiment, there are three lane-specific cameras: host, driver-adjacent, or passenger-adjacent, and the zipper stitching could follow the center vehicle, and limit other-lane effects. The system may judge vehicles/lanes priority, and use that for setting the stitching and merge planes. For example, the system may merge surfaces to follow either the most dangerous vehicle (as determined based on rate of approach and/or location of the detected vehicle) or the closest vehicle. The stitching may follow the lane curves, as much as possible, and may use special line fitting algorithms or calculations (such as a cubic spline line fitting function or the like) so that lane markers have a substantially continuous slope if they must cross the stitching area. For example, with gentle curves, the system may alter the stitching a small amount, while with more severe curves, the system may need to default to a center or curve-side camera dominance for stitching and merge surfaces. Optionally, the system may merge surfaces so as to adapt for vehicle presence, or not, in each of the three lanes.

Optionally, the fiducials used for calibration of the merging surfaces and merging borders in such a vision system may be indicators or LEDs along the host lane boundaries and back a distance from the host vehicle (such as for situations where there are no vehicles present behind the host vehicle) to enhance the depth perception of the displayed image. Optionally, the fiducials of such a vision system may be a series of vertical poles (such as poles that appear to be 5 meters high), along the host lane boundaries. In this way big trucks may look good, even up close in the host lane. There can be several fiducial sets of cones and LEDs. For example, there may be one set for no-curvature lanes and other sets for lane curvatures of say 100, 30, 10 meters for the respective radius of curvature. These sets of fiducials could be used to select multiple calibrations for merging surfaces when lanes have been measured for various radii of curvature for image aligning and conversion from image space to 3D space.

The process of image joining can similarly include those of front and side looking cameras also in a fashion similar to the rear-side system described above for an image that combines these images into one. The joining of images can include a resulting 360 degree image combining images from the front, rear and side facing cameras. The image stitching in such an application would follow the rules stated above. The stitching area itself, the pixels of the border, can be camouflaged by replacing by non-important image areas (pixels) nearby the stitching area which have similar contrast and color.

The imaging device and control and image processor and illumination source may comprise any suitable components, and may utilize aspects of the vision systems of the text described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The imaging device and/or control may be part of or share components or circuitry with other image or imaging or vision systems of the vehicle, such as headlamp control systems and/or rain sensing systems and/or cabin monitoring systems and/or the like.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. A vision system for a vehicle, said vehicle vision system comprising:

an image sensor and image processor, wherein said image sensor is disposed at a vehicle equipped with said vehicle vision system, said image sensor having a field of view exterior of the equipped vehicle for capturing image data of a scene forward of the equipped vehicle, said field of view encompassing at least a portion of a road surface ahead of and in the direction of travel of the equipped vehicle, said image processor processing captured image data;

wherein, responsive to image processing of captured image data by said image processor, said vehicle vision system detects the presence of an animal on the road surface within said field of view;

wherein, responsive at least in part to processing by said image processor of captured image data, said vehicle vision system determines whether the detected animal present on the road surface within said field of view is a live animal or a dead animal;

wherein said vehicle vision system reacts differently depending on whether the detected animal present on the road surface within said field of view is determined to be a live animal or a dead animal;

wherein, at least in part responsive to determination that the detected animal present on the road surface is a dead animal, said vehicle vision system determines a location of the dead animal relative to a path of the equipped vehicle;

wherein, at least in part responsive to determination that the detected animal present on the road surface is a dead animal on the road surface within said field of view and that the dead animal is in the path of the equipped vehicle, said vehicle vision system at least one of (a) generates an alert to alert a driver of the equipped vehicle of the presence of the dead animal and (b) controls the equipped vehicle to avoid hitting the dead animal with the equipped vehicle; and wherein, at least in part responsive to determination that the detected animal present on the road surface is a live animal, said vehicle vision system controls the equipped vehicle to avoid hitting the determined live animal with the equipped vehicle.

2. The vehicle vision system of claim 1, wherein said vehicle vision system is responsive at least in part to a selected level of risk for that the driver selects to take when operating the equipped vehicle.

3. The vehicle vision system of claim 1, wherein said vehicle vision system reacts differently depending on the type of animal that is determined, and wherein, at least in part responsive to determination that the detected animal present on the road surface is a selected type of animal on the road surface within said field of view, said vehicle vision system controls the equipped vehicle to provide evasive action to avoid hitting the determined type of animal with the equipped vehicle, and wherein, at least in part responsive to determination that the detected animal present on the road surface is another type of animal on the road surface within said field of view, said vehicle vision system does not control the equipped vehicle to avoid hitting the determined other type of animal.

4. The vehicle vision system of claim 1, wherein, at least in part responsive to determination that the detected animal present on the road surface is a live animal on the road surface within said field of view, said vehicle vision system controls the equipped vehicle to provide evasive action to avoid hitting the determined live animal.

5. The vehicle vision system of claim 1, comprising:
at least two image sensors having at least one of (a) a forward field of view and capturing image data of a scene forward of the equipped vehicle, (b) a rearward field of view and capturing image data of a scene rearward of the equipped vehicle and (c) a sideward field of view and capturing image data of a scene to the side of the equipped vehicle; and
a display displaying the captured images as a merged image with image stitching of the component images to minimize effects of image stitching.

6. The vehicle vision system of claim 1, wherein, at least in part responsive to determination of a live animal within said field of view, said vehicle vision system generates an alert.

7. The vehicle vision system of claim 1, wherein said vehicle vision system estimates a separation gap between the equipped vehicle and a leading vehicle.

8. The vehicle vision system of claim 7, wherein said separation gap is adjusted based on a current driving condition.

9. The vehicle vision system of claim 7, wherein said vehicle vision system adjusts said separation gap based on a driving capability of the driver of the equipped vehicle.

10. The vehicle vision system of claim 1, wherein said vehicle vision system determines movement of an object within said field of view.

11. The vehicle vision system of claim 10, wherein said vehicle vision system determines sliding of an object on the road surface within said field of view.

12. The vehicle vision system of claim 1, wherein said vehicle vision system is part of an adaptive cruise control system of the equipped vehicle.

13. The vehicle vision system of claim 1, wherein said vehicle vision system is operable to adjust an adaptive cruise control system of the equipped vehicle responsive to determination of a road condition ahead of the equipped vehicle.

14. The vehicle vision system of claim 13, wherein said vehicle vision system is operable to change a separation gap between the equipped vehicle and a vehicle ahead of the equipped vehicle based, at least in part, on an estimated stopping distance of the equipped vehicle.

15. A vision system for a vehicle, said vehicle vision system comprising:
an image sensor and image processor, wherein said image sensor is disposed at a vehicle equipped with said vehicle vision system, said image sensor having a field of view exterior of the equipped vehicle for capturing image data of a scene forward of the equipped vehicle, said field of view encompassing at least a portion of a road surface ahead of and in the direction of travel of the equipped vehicle, said image processor processing captured image data;
wherein, responsive to image processing of captured image data by said image processor, said vehicle vision system detects the presence of an animal on the road surface within said field of view;
wherein, responsive at least in part to processing by said image processor of captured image data, said vehicle vision system determines whether the detected animal present on the road surface within said field of view is a live animal or a dead animal;
wherein said vehicle vision system reacts differently depending on whether the detected animal present on the road surface within said field of view is determined to be a live animal or a dead animal;
wherein, at least in part responsive to determination that the detected animal present on the road surface is a dead animal, said vehicle vision system determines a location of the dead animal relative to a path of a tire of the equipped vehicle;
wherein, at least in part responsive to determination that the detected animal present on the road surface is a dead animal on the road surface within said field of view and that the dead animal is in the path of the tire of the equipped vehicle, said vehicle vision system at least one of (a) generates an alert to alert a driver of the equipped vehicle of the presence of the dead animal and (b) controls the equipped vehicle to avoid hitting the dead animal with the tire of the equipped vehicle; and
wherein, at least in part responsive to determination that the detected animal present on the road surface is a live animal, said vehicle vision system controls the equipped vehicle to provide evasive action to avoid hitting the determined live animal with the equipped vehicle.

16. The vehicle vision system of claim 15, wherein said vehicle vision system determines movement of an object within said field of view.

17. The vehicle vision system of claim 15, wherein said vehicle vision system is part of an adaptive cruise control system of the equipped vehicle.

18. A vision system for a vehicle, said vehicle vision system comprising:
an image sensor and image processor, wherein said image sensor is disposed at a vehicle equipped with said vehicle vision system, said image sensor having a field of view exterior of the equipped vehicle for capturing image data of a scene forward of the equipped vehicle, said field of view encompassing at least a portion of a road surface ahead of and in the direction of travel of the equipped vehicle, said image processor processing captured image data;

wherein, responsive to image processing of captured image data by said image processor, said vehicle vision system detects the presence of an animal on the road surface within said field of view;

wherein, responsive at least in part to processing by said image processor of captured image data, said vehicle vision system determines whether the detected animal present on the road surface within said field of view is a live animal or a dead animal;

wherein said vehicle vision system reacts differently depending on whether the detected animal present on the road surface within said field of view is determined to be a live animal or a dead animal;

wherein, at least in part responsive to determination that the detected animal present on the road surface is a dead animal, said vehicle vision system determines a location of the dead animal relative to a path of the equipped vehicle;

wherein, at least in part responsive to determination that the detected animal present on the road surface is a dead animal on the road surface within said field of view and that the dead animal is in the path of the equipped vehicle, said vehicle vision system controls the equipped vehicle to avoid hitting the dead animal with the equipped vehicle;

wherein said vision system reacts differently if said vehicle vision system determines the presence of a live animal within said field of view; and wherein, at least in part responsive to determination that the detected animal present on the road surface is a live animal within said field of view, said vehicle vision system controls the equipped vehicle to provide evasive action to avoid hitting the determined live animal with the equipped vehicle.

19. The vehicle vision system of claim 18, wherein said vehicle vision system determines movement of an object within said field of view.

20. The vehicle vision system of claim 18, wherein said vehicle vision system is part of an adaptive cruise control system of the equipped vehicle.

\* \* \* \* \*